April 25, 1961     W. S. PRAEG     2,980,966

METHOD OF MOLDING A GEAR FINISHING TOOL

Filed Sept. 29, 1958

INVENTOR.
WALTER S. PRAEG
BY
ATTORNEYS

United States Patent Office 2,980,966
Patented Apr. 25, 1961

2,980,966
METHOD OF MOLDING A GEAR FINISHING TOOL

Walter S. Praeg, Detroit, Mich., assignor to National Broach & Machine Company, Detroit, Mich., a corporation of Michigan Filed Sept. 29, 1958, Ser. No. 764,098

5 Claims. (Cl. 18—59)

The present invention relates to a method of molding a gear finishing tool.

It is an object of the present invention to provide a method of producing a gear finishing tool in the form of a gear-like body at least the toothed peripheral portions of which are formed of a resin compound having abrasive particles embedded therein, the teeth of said tool having longitudinally concave sides or flanks shaped to have extended area contact with the teeth of a work gear when the gear and tool are brought into mesh with the axes thereof crossed.

It is a further object of the present invention to provide a method of producing a tool as described in the preceding paragraph in which the teeth of the tool are cast to final form and exhibit the properties of a cast surface when new.

It is a further object of the present invention to provide a method of producing the tool defined in the preceding paragraphs characterized by the step of obtaining a controlled differential shrinkage of the resin compound longitudinally of the teeth so as to produce teeth which are longitudinally concave.

More specifically, it is an object of the present invention to provide a method of producing a gear finishing tool having a toothed peripheral portion formed of a resin compound having abrasive particles embedded therein which comprises providing a mold having toothed forming recesses which are of longitudinally uniform cross-sections, providing an annular recess bounded at one side by said mold and bounded at the surface opposite said mold by a transversely concave surface so as to define an annular chamber whose cross-sectional dimension taken in planes parallel to its axis varies from a minimum at opposite ends thereof and a maximum centrally thereof.

Other objects and features of the invention will become apparent as the description proceeds, especially when taken in conjunction with the accompanying drawings, illustrating preferred embodiments of the invention, wherein.

The present invention relates to gear honing. This is an operation in which a hardened work gear is run in mesh with either radial or circumferential controlled pressure, with a gear-like abrasive tool. At least the toothed peripheral portion of the tool is formed of a hard but slightly yieldable and highly resilient resin compound having abrasive particles embedded therein. The core of the tool is of a different material and may be metal or a suitable resin compound.

It is an essential feature of the present invention that the teeth of the tool be cast or molded to final dimensions and contour since as a practical matter it is impossible to machine the teeth after forming the tool.

In the usual operation, the tool and gear are operated in mesh with their axes crossed at a small angle. If the teeth of the gear and tool are both of uniform cross-section from end to end, this crossed axes relationship results in theoretical point contact between tooth surfaces. It is desirable to provide for extended area contact and this is accomplished by forming the teeth of the tool so that the side surfaces or flanks thereof are longitudinally concave. In use the teeth of the tool, while exhibiting exceptionally long life, wear down to some extent and after a period of use will become longitudinally concave so as to conform themselves to the teeth of the gear.

However, it is desirable to produce the teeth of the tool so that as cast and before use with a gear, they have the required longitudinally concave flanks or side surfaces. While the desirability of providing the teeth with the longitudinally concave sides or flanks is recognized, it is apparent that difficulties are presented in so molding or casting the teeth, particularly when it is recalled that the teeth must be in condition for use as cast and without subsequent machining. Obviously, if the gear is cast in a mold having teeth shaped to produce longitudinally concave teeth on the tool or casting, the teeth of the mold will be longitudinally convex and will interlock with the teeth of the tool so as to prevent separation. Of course, the mold may be made in two or more pieces which are separable but this inherently produces errors or at least surface irregularities along the line of junction.

In accordance with the present invention advantage is taken of the fact that the resin compound used to produce the peripheral portions of the tool undergoes a limited but substantially uniform shrinkage when cured. Epoxy resins are preferred for the production of the tool since these resins are characterized by relatively small but substantially constant and uniform mold shrinkage. Moreover, the degree of shrinkage may to some extent be controlled by the curing process, the amount of shrinkage increasing with increased temperature of cure. A specific epoxy resin suitable for producing tools as disclosed herein will be described subsequently.

Figure 1:
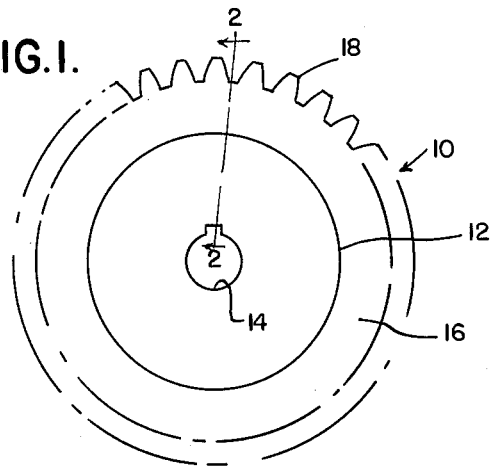
Figure 1 is an elevational view of a gear finishing tool constructed in accordance with the present invention.
Figure 2:
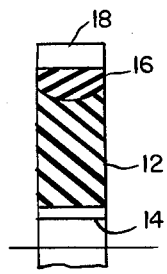
Figure 2 is a fragmentary section on the line 2—2, Figure 1.

Referring now to Figures 1 and 2 there is shown a tool 10 having a core 12 provided with a central opening 14. Surrounding the core 12 is an annular resin portion 16 formed of a suitable resin compound having teeth 18 molded or cast thereon.

Figure 3:
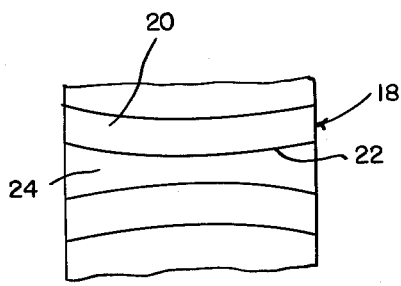
Figure 3 is an enlarged plan view of a longitudinally concave tooth of the gear finishing tool.
Figure 4:
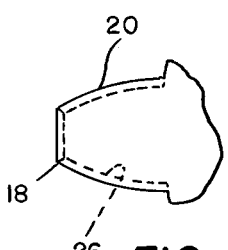
Figure 4 is an end view of the tooth shown in Figure 3.

Referring now to Figures 3 and 4 each tooth 18 includes side or flank surfaces 20 which are longitudinally concave. The concavity of the tooth is best apparent by the curved nature of the line 22 which represents the junction between the flank or side of a tooth and the top surface 24 thereof. The curvature is also indicated by the dotted lines 26 showing the thickness of the tooth 18 intermediate the ends thereof.

Figure 5:
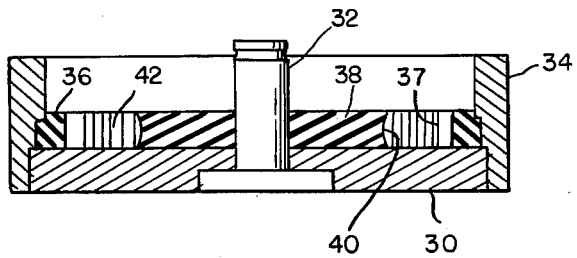
Figure 5 is a vertical median section through apparatus for producing a tool in accordance with the present invention.

Referring now to Figure 5 there is shown an assembly of structure for use in producing gear honing tools having longitudinally concave teeth as described above. The apparatus comprises a base 30 having a locating post 32 fixedly secured thereto. Mounted on the base 30 is a removable ring 34 having permanently secured thereto an annular mold member 36 which may be of a suitable resin compound. The mold member 36, as illustrated in Figure 5, is provided with a series of inwardly directed teeth 37 shaped to produce the required tooth spaces between the teeth of the tool. It may be mentioned that the mold 36 may conveniently be produced by assembling the ring 34 on the base and by providing a master gear on the locating post 32. Thereafter, the space between the master gear and ring 34 may be filled with the resin compound in plastic condition which is thereafter cured.

Mounted on the locating post 32 is a core member 38 which may be of metal or a suitable resin compound. In accordance with the present invention the peripheral edge 40 of the core is transversely concave so as to define an annular chamber 42 whose thickness as measured in planes perpendicular to its axis varies in a predetermined manner. Specifically, the thickness of the chamber 42 is at a minimum at the ends thereof as indicated by the dimension $d1$ and a maximum intermediate the ends thereof as indicated by the dimension $d2$.

With the construction as illustrated in Figure 5, the resin compound in a plastic condition is introduced into the annular chamber 42, care being taken to insure that it enters fully into all of the spaces between the teeth 37 of the mold member 36. It will also be recalled that the teeth 37 of the mold 36 are of uniform dimensions from end to end. In other words, if the mold is designed to produce a spur gear, the sides of the teeth 37 thereof are formed by straight line elements all of which are parallel to the axis of the locating post 32.

If the tool to be produced is helical then the teeth 37 of the mold are correspondingly helical but are of uniform cross-section from end to end.

The resin compound which is employed is mixed with a suitable filler and is provided with a substntial quantity of abrasive grains as will subsequently be described. Just prior to introduction of the material in a plastic condition into the mold area 42, the compound is mixed with a hardener or curing agent.

After the material has been introduced into the mold 42 it is allowed to cure. Under suitable conditions this curing may take place under normal room temperature. However, the curing process is accelerated by heat and in addition a curing of the material under heat produces improved results in the finished product. Normally, the curing operation may take place under a temperature of approximtely 100 degrees Fahrenheit. In the present case however, it is preferred to carry out the operation under a somewhat higher temperature, as for example 150 degrees or even 180 degrees. The resin compound of which the peripheral portion 16 of the tool is formed, undergoes a small but definite and uniform shrinkage in the mold during curing. This mold shrinkage permits a controlled formation of the teeth of the tool while at the same time permitting the finished tool to be withdrawn from the mold.

Figure 6:
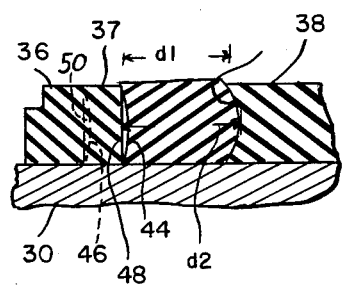
Figure 6 is an enlarged fragmentary sectional view illustrating the manner in which the tool teeth are modified.

Referring to Figure 6, it will be observed that the thickness of the peripheral portion of the tool at the intermediate portion of the teeth is indicated by the dimension $d2$, which may be substantially greater than the dimensions of the mold cavity at the ends thereof, as indicated at $d1$. Since the shrinkage of the resin compound during curing is uniform in nature, relatively more shrinkage takes place at the intermediate portions of the teeth than at the ends thereof. This has been indicated in Figure 6 by the lines 44 and 46, the former representing the root surface of the teeth on the tool and the latter representing the crest surface thereof. It will be observed that both have pulled away slightly from the corresponding surfaces 48 and 50 of the mold.

It may be mentioned that a suitable parting compound such as a wax, is provided on the toothed portion of the mold 36 so that shrinkage of the compound causes the material to pull away from the mold rather than from the concave surface 40 of the core. Moreover, the mold shrinkage tends to cause movement radially inwardly of the annular body of resin compound in the annular chamber 42.

It will be appreciated that the amount of concavity provided on the teeth of the tool may be controlled by a number of factors. In the first place, it is directly controlled by the amount of concavity provided at 40 on the peripheral edge of the core 38. Secondly, it may be controlled by the radial dimension of the chamber 42. The greater the radial dimension of the chamber 42 the greater the amount of shrinkage as is readily apparent. Finally, with any particular resin compound mold shrinkage may be increased by an elevated curing temperature.

A suitable resin compound for use in practicing the present invention is described below:

An epoxy resin suitable for this invention may be produced by reacting epichlorohydrin and bisphenol A in the presence of a sodium hydroxide solution in water. The reaction is carried out at a temperature of about 100 degrees centigrade. After the condensation reaction has taken place, the resin is freed of residual epichlorohydrin and is washed well to remove salt and soluble byproducts. The reaction is carried out to produce a reaction product having an average molecular weight of approximately 400. The resin is a liquid. The epoxy value, equiv./100 gm. is 0.50. The hydroxyl groups per molecule are 0.14–0.28.

The epoxy resin described above is mixed with an approximately equal weight of a suitable filler such for example as finely divided silicon carbide. This filled resin, just prior to introduction into the mold to produce the abrasive tool, has introduced thereinto abrasive particles such for example as silicon carbide, which may be of between 46 and 280 grit. Approximately 100 parts by weight of the filled resin is thoroughly mixed with 100–150 parts of the abrasive grains. A suitable curing agent or hardener is provided, such for example as an aliphatic amine or a poly-amine.

In referring to the modification of the tooth surfaces of a gear-like tool, it is necessary to adopt a terminology having a single clear meaning. Herein, the dimension of the gear teeth between opposite ends is referred to as length, the dimension from root to crest or top is referred to as height, and the dimension between the opposed sides or flanks of a single tooth is referred to as thickness.

The drawings and the foregoing specification constitute a description of the improved gear finishing tool and a method of making the same in such full, clear, concise and exact terms as to enable any person skilled in the art to practice the invention, the scope of which is indicated by the appended claims.

What I claim as my invention is:

1. The method of making a gear finishing tool which comprises positioning a core of circular cross-section in centered and radially spaced relation in a generally cylindrical internally toothed mold, providing the core with a continuous circumferentially extending outwardly concave channel along its edge confronting the toothed surface of said mold, filling the annular space between the core and mold with a resin compound which shrinks on curing, curing the compound to cause the compound to shrink away from said mold to produce teeth having longitudinally concave sides.

2. The method of making a gear finishing tool which comprises positioning a core of circular cross-section in centered and radially spaced relation in a generally cylindrical internally toothed mold, providing the core with a continuous circumferentially extending radially outwardly concave channel along its edge confronting the toothed surface of said mold, providing a parting agent on the toothed portions of said mold, filling the space between the core and mold with a resin compound which shrinks on curing, curing the compound to cause the compound to shrink away from said mold to produce teeth having longitudinally concave sides.

3. The method of making a gear finishing tool which comprises positioning a core of circular cross-section in centered and radially spaced relation in a generally cylindrical internally toothed mold, providing the core with a continuous circumferentially extending radially outwardly concave channel along its edge confronting the toothed surface of said mold thereby forming an annular mold space whose radial dimension increases from opposite ends to the center thereof, filling the space between the core and mold with a resin compound which shrinks on curing, curing the compound to cause the compound to shrink away from said mold to produce teeth having longitudinally concave sides.

4. The method of making a gear finishing tool which comprises positioning a core of circular cross-section in centered and radially spaced relation in a generally cylindrical internally toothed mold, providing the core with a continuous circumferentially extending radially outwardly concave channel along its edge confronting the toothed surface of said mold thereby forming an annular mold space whose radial dimension increases from opposite ends to the center thereof, filling the space between the core and mold with an epoxy resin compound which shrinks on curing and which includes a curing agent, curing the compound by heating to a temperature above 100 degrees Fahrenheit to cause the compound to shrink away from said mold to produce teeth having longitudinally concave sides.

5. The method of making a gear finishing tool which comprises positioning a core of circular cross-section in centered and radially spaced relation in a generally cylindrical internally toothed mold, providing the core with a continuous circumferentially extending radially outwardly concave channel along its edge confronting the toothed surface of said mold thereby forming an annular mold space whose radial dimension increases from opposite ends to the center thereof, filling the space between the core and mold with a thermal setting epoxy resin compound which shrinks on curing and which includes a curing agent, curing the compound by heating to a temperature above 100 degrees Fahrenheit to cause the compound to shrink away from said mold to produce teeth having longitudinally concave sides.

References Cited in the file of this patent

UNITED STATES PATENTS 2,874,412     Flemming et al. _____ Feb. 24, 1959

FOREIGN PATENTS 243,518     Great Britain _____ Dec. 3, 1925